E. FISHER.
VALVE.
APPLICATION FILED DEC. 9, 1913.

1,157,642.

Patented Oct. 19, 1915.

WITNESSES.
Chas. W. Eddy.
Freda C. Anderson.

INVENTOR.
Emanuel Fisher
By Horatio E. Bellows
ATTORNEY.

COLUMBIA PLANOGRAPH CO., WASHINGTON, D. C.

United States Patent Office.

EMANUEL FISHER, OF PROVIDENCE, RHODE ISLAND, ASSIGNOR TO NELLIE FISHER, OF PROVIDENCE, RHODE ISLAND.

VALVE.

1,157,642.

Specification of Letters Patent.   Patented Oct. 19, 1915.

Application filed December 9, 1913.   Serial No. 805,656.

*To all whom it may concern:*

Be it known that I, EMANUEL FISHER, a citizen of the United States, residing at Providence, in the county of Providence and State of Rhode Island, have invented certain new and useful Improvements in Valves, of which the following is a specification.

My invention relates to valves and has for its essential objects the prolongation of the life of the valve, and the provision of means for presenting a succession of the valve faces to a seat without the removal of the valve from its mounting.

The invention accordingly consists in the features of construction, combinations of elements, and arrangement of parts which will be exemplified in the construction hereinafter set forth, and the scope of the application of which will be indicated in the appended claims.

Figure 1:
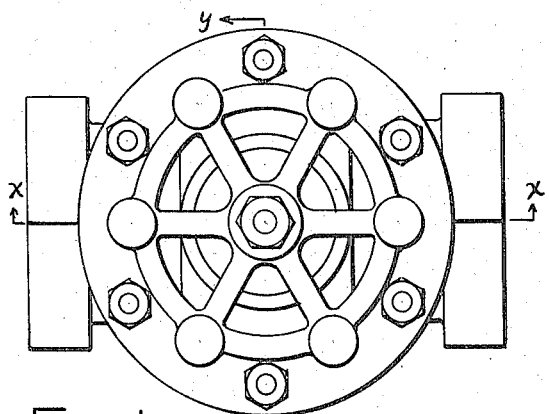
Figure 2:
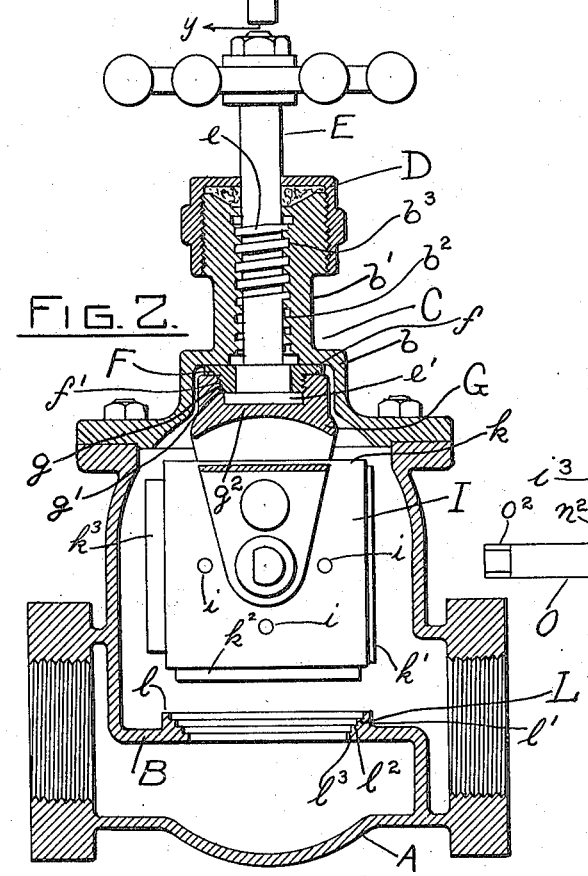
Figure 3:
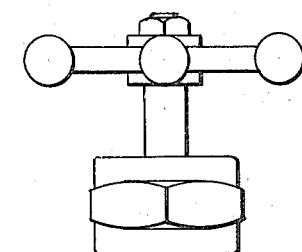

In the accompanying drawings which form a part of this specification, and wherein like reference characters indicate like parts throughout the claims, Figure 1 is a plan view of my novel valve, Fig. 2, a section, partially in side elevation on line $x$ $x$ of Fig. 1, and Fig. 3, a section, partly in elevation, on line $y$ $y$ of Fig. 1.

The valve casing may be of any usual or preferred form best adapted to carry the operative parts. In the present instance it comprises the shell A, partition B, and head C. The head comprises a hollow base $b$ and a vertical neck $b'$ having a central passage $b^2$ provided with threads $b^3$. Upon the upper end of the neck is a cap nut D. The valve stem E has threads $e$ engaging the threads $b^3$, and has upon its inner end a flange $e'$ upon which rests a collar F provided with a peripheral flange $f$ upon its upper end, having external threads $f'$ engaging threads $g$ in an opening $g'$ in the crossbar $g^2$ of a yoke or holder G. The stem is thus firmly but detachably fixed to the holder. The latter has integral arms or ears $g^3$ depending from the ends of the member $g^2$.

Rotatably mounted in openings $g^4$ in the arms $g^3$ is a shaft H to which is fixed by a key $h$ or otherwise a rectangular or substantially cube shaped valve body I provided, on one of its side faces with four cavities $i$ annularly arranged around the axis H and located ninety degrees apart. In one of the arms $g^3$ is a recess $i^2$ in which is located a spring $i^3$ upon which is seated a ball $i^4$ protruding into the path of the cavities $i$, and adapted to retain the cube in the successive positions of its quarter turns.

The periphery of the valve body I is provided with four acting valve faces $k$, $k'$, $k^2$, and $k^3$. In the present instance the face $k$ is a plane surface, while the other faces are of successively increasing thickness, but the height, depression, or other form of acting faces is immaterial so long as they properly register with the valve seat.

In the present instance the valve seat L in the partition B comprises a top face $l$ and internal stepped faces $l'$, $l^2$, and $l^3$ to accommodate respectively the valve faces $k$, $k'$, $k^2$, and $k^3$. After wear upon any one of the valve faces, the valve may be turned a quarter of a revolution or more to present a fresh face to the valve seat. To facilitate this rotation it will be noted that the yoke member $g^2$ is preferably transversely concaved. The valve may be rotated by any preferred means. The method herein shown consists in providing a squared cavity $m$ in one end of the shaft H, and slidably mounting in alinement therewith, in a bearing N of the casing, a wrench O to coöperate therewith.

In detail the bearing N has a circular bore $n$ enlarged and squared at its inner end as at $n'$. The wrench O comprises a cylindrical rod or shank $o$, having an enlarged square head $o'$ adapted to fit in the opening $n'$ and in the cavity $m$. Its outer end is segmental or squared as at $o^2$ to accommodate a wrench. The bearing N includes a stuffing box $n^2$. When it is desired to turn the valve, the wrench or rod $o$ is manually slid into the cavity $m$ and given a turn by means of a wrench applied to the end $o^2$ or otherwise.

It will be observed that while under steam, and without disassembling any of the constituent parts of the valve, or casing, the valve faces may be changed.

It will be understood that the cavities $i$ depend in number and arrangement upon the number and location of the acting valve faces.

What I claim is,—

1. In a device of the type set forth, the combination with the valve casing of a valve seat disposed at right angles to the valve stem, a valve stem in the casing movable toward and away from the seat, a yoke upon the valve stem, a valve shaft rotatably mounted in the yoke, and provided with a cavity in its end, a valve upon the valve shaft and a rod in the casing adapted to register in the cavity.

2. In a device of the type set forth, the combination with the valve casing and valve seat, of a valve stem in the casing, a yoke upon the valve stem, a valve provided with a plurality of working faces rotatably mounted in the yoke, means in the casing for rotating the valve, and means for intermittently retaining the valve during its rotation.

3. In a device of the type set forth, the combination with the valve casing and valve seat, of a valve stem in the casing, a yoke upon the valve stem, a valve provided with a plurality of acting faces upon its periphery mounted in the yoke, said valve being provided upon its side face with cavities corresponding in number with the peripheral faces of the valve, a member yieldingly mounted adjacent the valve in the path of rotation of the cavities, and means for rotating the valve.

In testimony whereof I have affixed my signature in presence of two witnesses.

EMANUEL FISHER.

Witnesses:
EDW. H. ZIEGLER,
HORATIO E. BELLOWS.

Copies of this patent may be obtained for five cents each, by addressing the "Commissioner of Patents, Washington, D. C."